Jan. 18, 1944.       D. O. SPROULE       2,339,588
ECHO SOUNDING APPARATUS
Original Filed July 22, 1937

INVENTOR
Donald Orr Sproule
BY
Hoguet, Neary & Campbell
ATTORNEY

Patented Jan. 18, 1944

2,339,588

UNITED STATES PATENT OFFICE 2,339,588

ECHO SOUNDING APPARATUS

Donald Orr Sproule, London, England, assignor of one-third to Arthur Joseph Hughes, Chigwell Row, Essex, England, and one-third to Henry Hughes & Son Limited, London, England, a British company Original application July 22, 1937, Serial No. 155,066, now Patent No. 2,260,347, dated October 28, 1941. Divided and this application May 5, 1941, Serial No. 391,910. In Great Britain July 36, 1936

6 Claims. (Cl. 177—386)

This invention relates to improvements in echo sounding apparatus and has for its principal object to simplify such apparatus and to reduce the weight thereof thereby enabling such apparatus to be applied more readily to aircraft for the determination of altitude.

Another object of the invention is to provide means whereby the indicating device can be dissociated mechanically from the rest of the apparatus and be installed in any convenient position, where it can be energized by electric currents flowing through conductors, whilst maintaining the necessary synchronization.

A further object of the invention is to provide means whereby indicating apparatus of simple and robust construction can be arranged to control the sound pulse transmitter in a more reliable and effective manner than has been possible heretofore.

This is a division of my application Serial No. 155,066, filed July 22, 1937, now Patent No. 2,260,347, dated October 28, 1941.

Visual indicators for echo sounding apparatus are known in which the time period between the moment of emission of a sound pulse and the moment of reception of its echo pulse is measured as the angular displacement of an oscillating member which commences its excursion at the moment of emission of the sound pulse.

In a general way, visual indicators of this kind comprise a member adapted to oscillate periodically, impulse means for oscillating said member, means for stressing said impulse means and for releasing said member immediately prior to the moment of emission of a sound pulse, means adapted to indicate the position of said member at the moment of excitation by an echo pulse and means whereby the angular displacement of the member at the moment of excitation by the echo pulse can be ascertained.

This invention consists in the arrangement of an element, having a natural time constant for controlling the moment of emission of a sound pulse and the moment of release of the member stressed by the impulse means; said element being energised at the appropriate moment by the said member to effect the required control in proper sequence.

Figure 1:
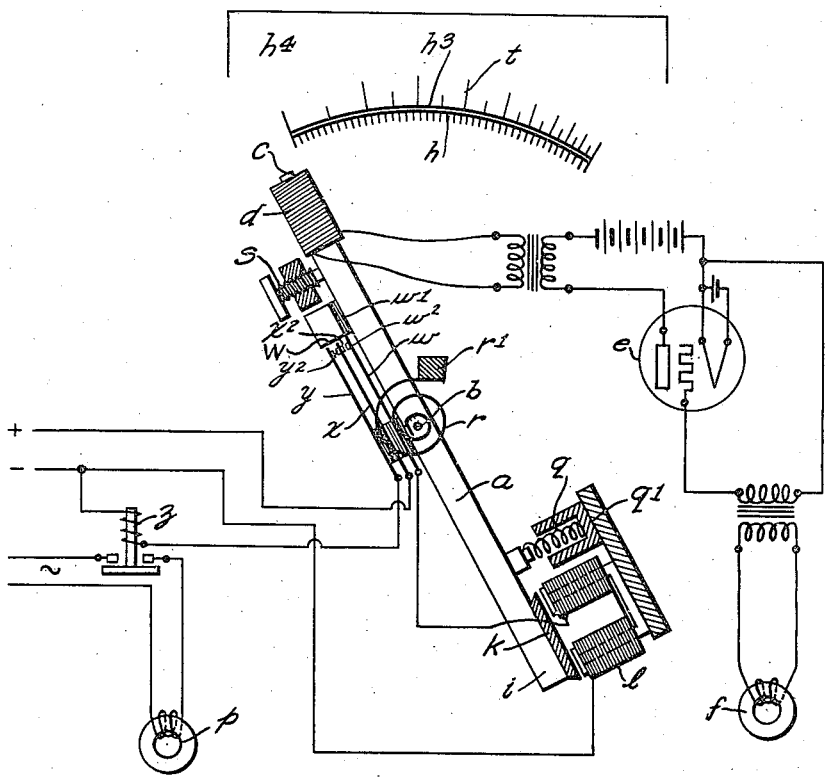
Figure 2:
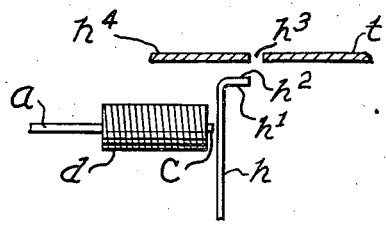

For a better understanding of the invention, reference may be had to the accompanying drawing in which:

Figure 1 shows diagrammatically one form of the improved indicator for use with echo sounding apparatus; and Figure 2 is a fragmentary side elevation of the indicator, showing details thereof.

In the drawing, $a$ is a bar pivoted at $b$ and having on the end $i$ an armature $k$, for example of soft iron, arranged to be attracted by a fixed electromagnet hereinafter called the timing magnet $l$, the winding of which is energised by electrical currents controlled by the contacts $x^2w^2$ as explained hereinafter.

In order that impulses may be imparted to the bar $a$ and cause it to oscillate, two spring systems are provided viz: a system having an impulse spring $q$ mounted between the bar $a$ and an abutment $q^1$ so arranged that it is compressed by the bar $a$ when the timing magnet $l$ is energised by current flowing from the positive of the mains through the contacts $x^2w^2$ closed by the resilient pendulum $w$ having a weight W on its outer end, and through the winding of the timing magnet $l$ to the negative of the mains, and a system having a restoring spring $r$, one end of which is mounted on the fixed abutment $r^1$ and the other end on the bar $a$ so arranged as to urge the bar $a$ to move and bring the armature $k$ thereon into proximity with the timing magnet $l$.

Inasmuch as the pivoted bar $a$ has a definite periodic time, it is employed to control the sound pulse transmitter thus reducing the weight of the apparatus as a whole.

To this end the oscillating bar $a$ is provided with and carries inertia operated switches having suitably adjusted periodic times so that when the bar $a$ comes into contact with the spring $q$ during its return, the resilient pendulum $w$ moves away from the pad $w^1$ and effects electrical connection through the contacts $w^2$ and $x^2$ thus establishing an electrical circuit from the positive of the mains through the blades $x$ and $w$ and the winding of the timing magnet $l$ to the negative of the mains, thereby attracting the bar $a$, bringing it against the stop S, and compressing the spring $q$.

Further movement of the pendulum $w$ in the same direction brings the contact $x^3$ into electrical connection with the contact $y^3$ thus establishing an electrical circuit from the positive of the mains through the blades $x$ and $y$ to the winding $z$ of the contactor for the sound pulse transmitter $p$ and thence to the negative of the mains. The contactor for the sound pulse transmitter $p$ is closed by the coil $z$ after engagement of the contacts $x^2$ and $y^2$, thereby causing a sound pulse to be emitted.

The pendulum $w$, due to its resiliency, swings back toward the bar $a$, thereby permitting the contacts $y^2$ and $x^2$ to disengage and thereafter disengaging the contacts $x^2$ and $w^2$. Upon disengagement of the contacts $x^2$ and $w^2$, the magnet $l$ is deenergized, thereby permitting the spring $q$ to urge the bar $a$ in a clockwise direction.

Thus it will be seen that whenever the bar $a$ is arrested by the spring $q$ the sequence of comuleting the circuit of the timing magnet $l$, the circuit of the sound pulse transmitter $p$ and the release of the timing magnet $l$ are effected regularly in proper sequence.

In construction the moving parts are balanced to reduce the effect of external accelerations and the mass and elastic factors are suited to the periodic time of operation, air resistance and friction are reduced as much as possible and an adjustable stop $s$ is provided to limit the free movement of the bar $a$ as required.

To enable the moment of reception of the echo pulse relatively to the moment of emission of the sound pulse to be ascertained indicating means energised by the echo pulse are provided.

The indicating means may be of any known kind such as elastic cantilevers, flashing light, galvanometer or electrochemical devices.

For example the end $c$ of the bar $a$ is provided with an electrical winding hereinafter called the pulse magnet $d$, said winding being energised from time to time by electrical pulses from a thermionic amplifier $e$ (with or without initial pulse suppression means) excited by the echo pulse receiver $f$.

As shown in Fig. 2, in proximity with the path of the pulse magnet $d$ a plurality of elastic cantilevers $h$ of magnetic material is arranged as a curved series, the free end of each cantilever $h$ being bent over at an angle $h'$ and being whitened or silvered on its external surface so that exhibition of this surface through the slot $h^3$ in the mask $h^4$ enables any movement of any cantilever $h$ when disturbed by the magnetic flux in the pulse magnet $d$ to be detected relatively to the scale $t$ upon the outside of the mask $h^4$.

For the purpose of explanation elastic cantilevers $h$ of magnetic material and a pulse magnet $d$ energised electrically have been referred to but it is to be understood that the invention contemplates the substitution of electrostatic, electromechanical or equivalent means for the electromagnetic means when required, alternatively means of a different kind may be used for revealing the position of the oscillating member $a$ at the moment of arrival of the echo pulse.

For example a neon tube or other light source of small time delay may be substituted for the pulse magnet $d$ and elastic cantilevers $h$, said tube being energised to flash (at the moment of excitation of the echo pulse receiver $f$) by suitable means which may be associated with a thermionic amplifier and observed through the slot $h^3$; or a mirror galvanometer may be substituted for the pulse magnet $d$ and elastic cantilevers $h$ and arranged relatively to a light source and a screen adjacent the scale $t$ so that a spot of light appears on the screen at the moment of excitation of the echo pulse reveiver $f$; or the pulse magnet $d$ and elastic cantilever $h$ may be replaced by a stylus which moves in proximity to a sensitized paper surface travelling across a platen, the stylus and platen being included in known manner in an electric circuit controlled by the echo pulse receiver and adjuncts to produce a graphic record of the moment of reception of an echo pulse.

I claim:

1. An improved visual indicator for echo sounding apparatus having a transmitter and an echo impulse receiver; in combination a scale, a vibratable element having one end movable adjacent to said scale, resilient means for vibrating said element, electromagnetic means for attracting said element and storing energy in said resilient means, a switch for energizing and deenergizing said electromagnetic means and for controlling energization of said transmitter, inertia means actuated by said element adjacent one end of said scale for closing the first-mentioned switch to energize said electromagnetic means and energize said transmitter, and indicating means on said one end of said element electrically connected to said echo impulse receiver for indicating on said scale the instant of reception of an echo impulse by said receiver.

2. An improved visual indicator for echo sounding apparatus having a sound pulse transmitter and an echo impulse receiver; the combination of a scale, a vibratable element having an end portion movable along a path adjacent to said scale, stationary electrical holding means for attracting said element, a resilient pendulum having an electrical contact on said vibratable element, an electrical contact blade on said element in spaced relation to said pendulum controlling the flow of electric current to said holding means, another contact blade on said element in spaced relation to said pendulum for controlling the flow of electric current to said sound pulse transmitter, said pendulum and contact blades being movable into engagement by inertia when the element approaches one end of its path, to energize said holding means and said transmitter, and means on said element electrically connected to said receiver for indicating visually the reception of an echo impulse.

3. An indicator for echo sounding devices having a transmitter and an echo impulse receiver; the combination of a vibratable member having an end portion movable through a path at a predetermined frequency, means on said end portion connected to said echo impulse receiver for indicating the reception of an echo impulse, a scale adjacent to said path having a reference point thereon, means for imparting vibratory motion to said member including electromagnetic means for attracting said member, a switch having normally spaced apart contacts for energizing said electromagnetic means, a second switch having normally spaced apart contacts for energizing said transmitter and an inertia member connected to one of said contacts for moving said contacts into engagement to energize said electromagnetic means and said transmitter when said end portion approaches said reference point.

4. An indicator for echo sounding apparatus having an impulse transmitter and an echo receiver; the combination of a vibratable member having an end portion movable through a path at a predetermined frequency, a scale extending adjacent to said path having a reference point thereon, means for imparting vibratory motion to said member, electromagnetic means for attracting said member when said end portion is adjacent to said reference point to store energy in said first means, a switch having a pair of normally spaced apart contacts for connecting and disconnecting said electromagnetic means and a source of electrical energy, a second switch having normally spaced apart contacts for energizing said transmitter, resilient means supporting one of said contacts, inertia means on said resilient means, responsive to return of said member adjacent said reference point for engaging said contacts to energize said electromagnetic means and said transmitter, and echo impulse excited means on said end portion of said member and electrically connected to said echo impulse receiver for indicating visually the instant of excitation.

5. An indicator for echo sounding devices having a transmitter and an echo impulse receiver, the combination of a vibratable member having an end portion movable through a path at a predetermined frequency, a scale having a reference point thereon extending adjacent to said path, spring means for causing said member to vibrate, electromagnetic means for attracting said member when the latter is adjacent to said reference point to store energy in said spring means, a switch having a plurality of normally spaced apart contacts for connecting and disconnecting said electromagnetic means, said transmitter and a source of electrical energy, resilient means supporting at least one of said contacts, inertia means on said resilient means for closing said contacts in response to return of said end portion to adjacent said reference point to energize said electromagnetic means and actuate said transmitter, and means on said end portion electrically connected to said echo impulse receiver for indicating visually the instant of reception of an echo impulse.

6. An indicator for echo sounding devices having a transmitter and an echo impulse receiver; the combination of a vibratable member having an end portion movable through a path at a predetermined frequency, a scale having a reference point thereon extending adjacent to said path, means for causing said member to vibrate, electromagnetic means for attracting said member when the latter is adjacent to said reference point to store energy in said first means, a switch on said vibratable member having a plurality of normally spaced apart contacts for connecting and disconnecting said electromagnetic means, said transmitter and a source of electrical energy, resilient means supporting at least one of said contacts, inertia means on said resilient means for closing said contacts in response to return of said end portion to adjacent said reference point to energize said electromagnetic means and actuate said transmitter, and means on said end portion electrically connected to said echo impulse receiver for indicating visually the instant of reception of an echo impulse.

DONALD ORR SPROULE.